US005739750A

United States Patent [19]
Drake

[11] Patent Number: 5,739,750
[45] Date of Patent: Apr. 14, 1998

[54] BRAKE LIGHT FOR BICYCLE

[76] Inventor: Jeff Drake, 7240 Box 3, Telegraph Square Dr., Lorton, Va. 22079

[21] Appl. No.: 696,800

[22] Filed: Aug. 14, 1996

Related U.S. Application Data

[60] Provisional application No. 60/008,916, Dec. 20, 1995.

[51] Int. Cl.⁶ ........................................ B62J 6/00
[52] U.S. Cl. .................... 340/432; 340/464; 340/479; 200/61.12; 188/24.22; 362/72
[58] Field of Search .................... 340/432, 464, 340/479; 200/61.12, 61.13, 61.14, 61.41, 61.42, 52 R; 188/24.12, 24.21, 24.22; 280/288.4; 362/72, 802

[56] References Cited

U.S. PATENT DOCUMENTS

| | | | |
|---|---|---|---|
| 3,188,418 | 6/1965 | Pino | 340/432 |
| 3,878,387 | 4/1975 | Kovacic | 340/432 |
| 3,906,443 | 9/1975 | Musselman | 340/432 |
| 4,031,343 | 6/1977 | Sopko | 340/432 |
| 4,204,191 | 5/1980 | Daniels | 340/432 |
| 4,760,372 | 7/1988 | Watson | 340/432 |
| 4,792,882 | 12/1988 | Guevremont | 362/72 |
| 4,833,444 | 5/1989 | Wisniewski | 340/432 |
| 4,858,081 | 8/1989 | James | 362/72 |
| 4,896,138 | 1/1990 | Nickols | 340/479 |
| 4,920,464 | 4/1990 | Balentine, III | 340/432 |
| 5,526,240 | 6/1996 | Kuo | 362/72 |

*Primary Examiner*—Thomas Mullen
*Assistant Examiner*—Daniel J. Wu
*Attorney, Agent, or Firm*—Shlesinger Arkwright & Garvey LLP

[57] ABSTRACT

A brake light for a bicycle comprises a self-contained housing for attaching to the bicycle main frame below the seat. A microswitch controls the operation of the brake light. A spring biased pivoting actuating arm rests on the rear caliper brake cable adjacent a protrusion or projection on the cable. When the rear caliper brake is actuated, the cable is pulled forward, causing the actuating arm to ride up on the projection, thereby actuating the switch for the brake light. When the rear caliper brake is released, the cable and the projection move downwardly, causing the actuating arm to move down toward the cable, thereby deactivating the microswitch.

16 Claims, 3 Drawing Sheets

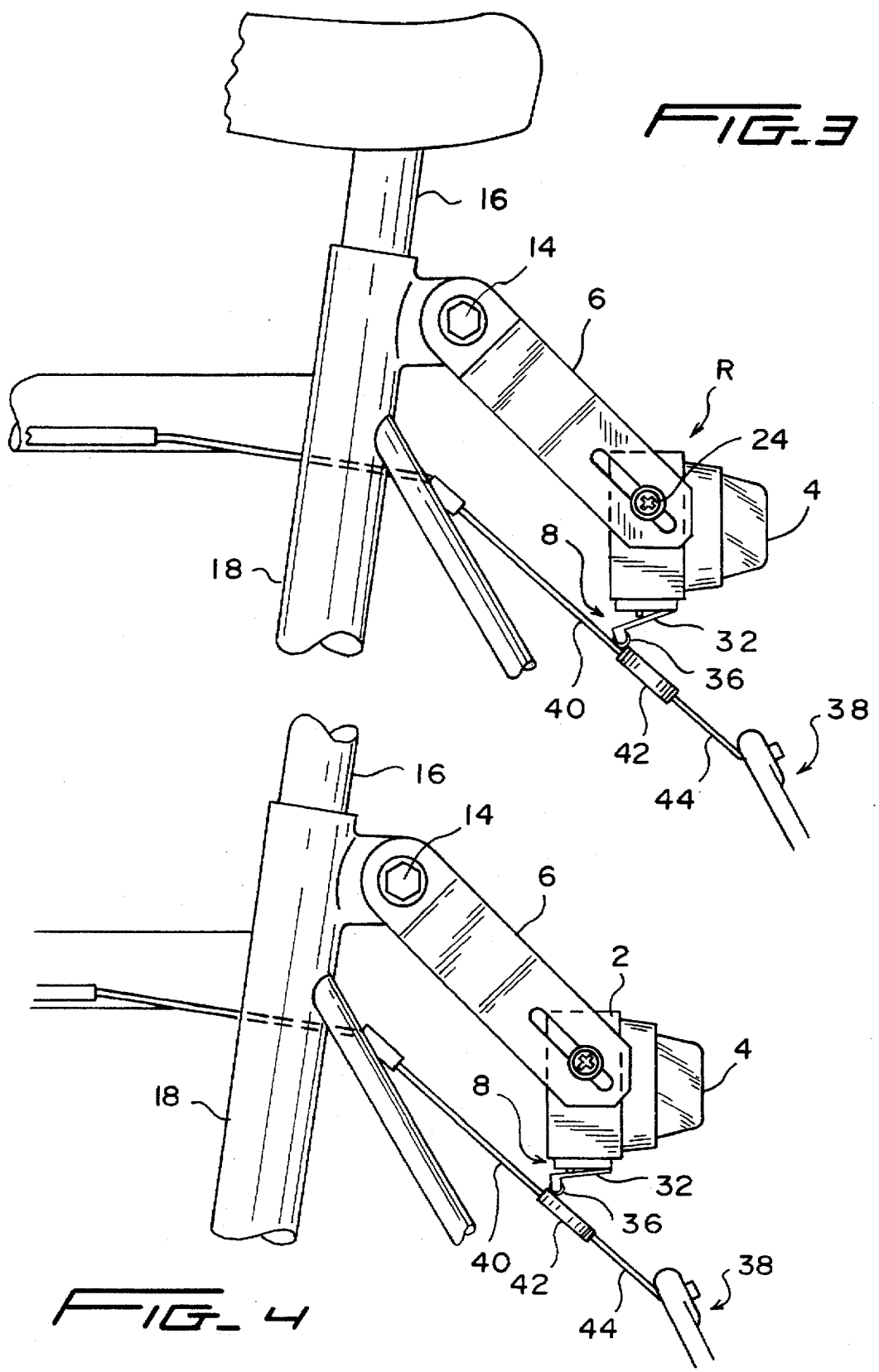

BRAKE LIGHT FOR BICYCLE

RELATED APPLICATION

This is a regular application of Provisional application Ser. No. 60/008,916, filed on Dec. 20, 1995, which is hereby incorporated by reference.

FIELD OF THE INVENTION

The present invention relates generally to a brake light for a bicycle and specifically to a brake light operated by the rear caliper cable of a bicycle.

BACKGROUND OF THE INVENTION

Bicycles are typically not provided with a brake light. As more people use the bicycle as part of their leisure activities or for commuting, it has become desirable to provide bicycle with a brake light to increase its safety.

Prior art brake lights are available; however, these devices require some wiring for proper installation. The wiring is typically exposed to the environment, and thereby susceptible to premature failure of the unit.

There is therefore a need for a brake light that can be retro-fitted to bicycle, which brake light is completely self-contained, without requiring exterior wiring for proper installation.

OBJECTS AND SUMMARY OF THE INVENTION

It is an object of the present invention to provide a brake light assembly for a bicycle that is self-contained and relatively easy to install.

It is another object of the present invention to provide a brake light assembly that requires no exterior wiring to install.

It is still another object of the present invention to provide a brake light assembly that is connected to the rear caliper brake so that the light is turned on whenever the brake is actuated.

It is yet another object of the present invention to provide a brake light assembly that is relatively easy to maintain.

It is another object of the present invention to provide a brake light assembly that is a retro-fit kit suitable for many bicycle models.

It is still another object of the present invention to provide a brake light assembly that is relatively inexpensive to manufacture.

In summary, the present invention provides a brake light assembly that is self-contained and uses a microswitch that cooperates with a rear caliper brake cable such that when the rear caliper brake is actuated, the brake light is also actuated, thereby providing a safety warning to any following vehicle.

BRIEF DESCRIPTION OF THE DRAWINGS

FIG. 3 is a side elevational view of the brake light assembly of FIG. 1, shown in the OFF position.

FIG. 4 is a side elevational view of the brake light assembly of FIG. 1, shown in the ON position.

DETAILED DESCRIPTION OF THE INVENTION

Figure 1:
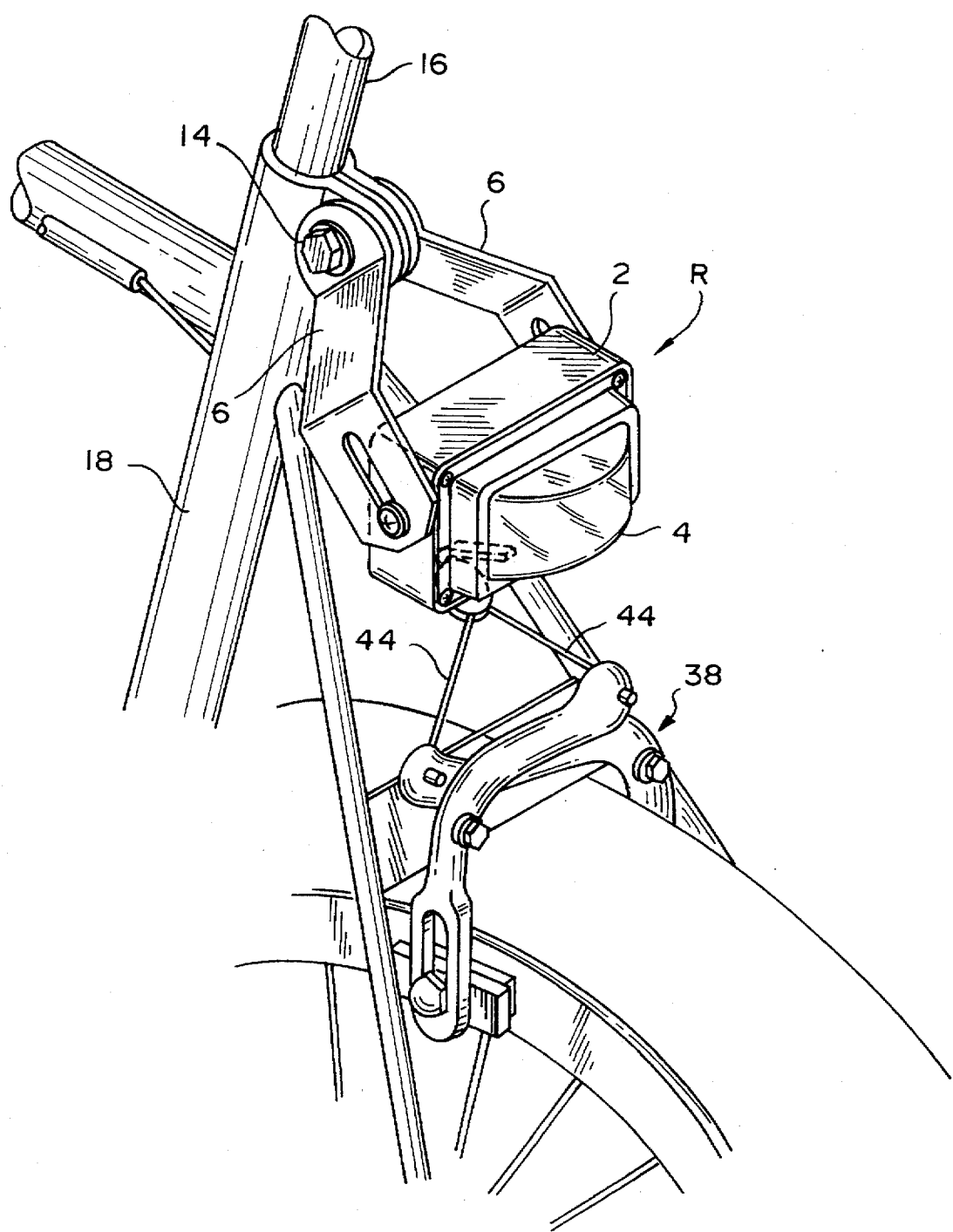
FIG. 1 is a perspective view of a brake light made in accordance with the present invention as secured to a bicycle frame.
Figure 2:
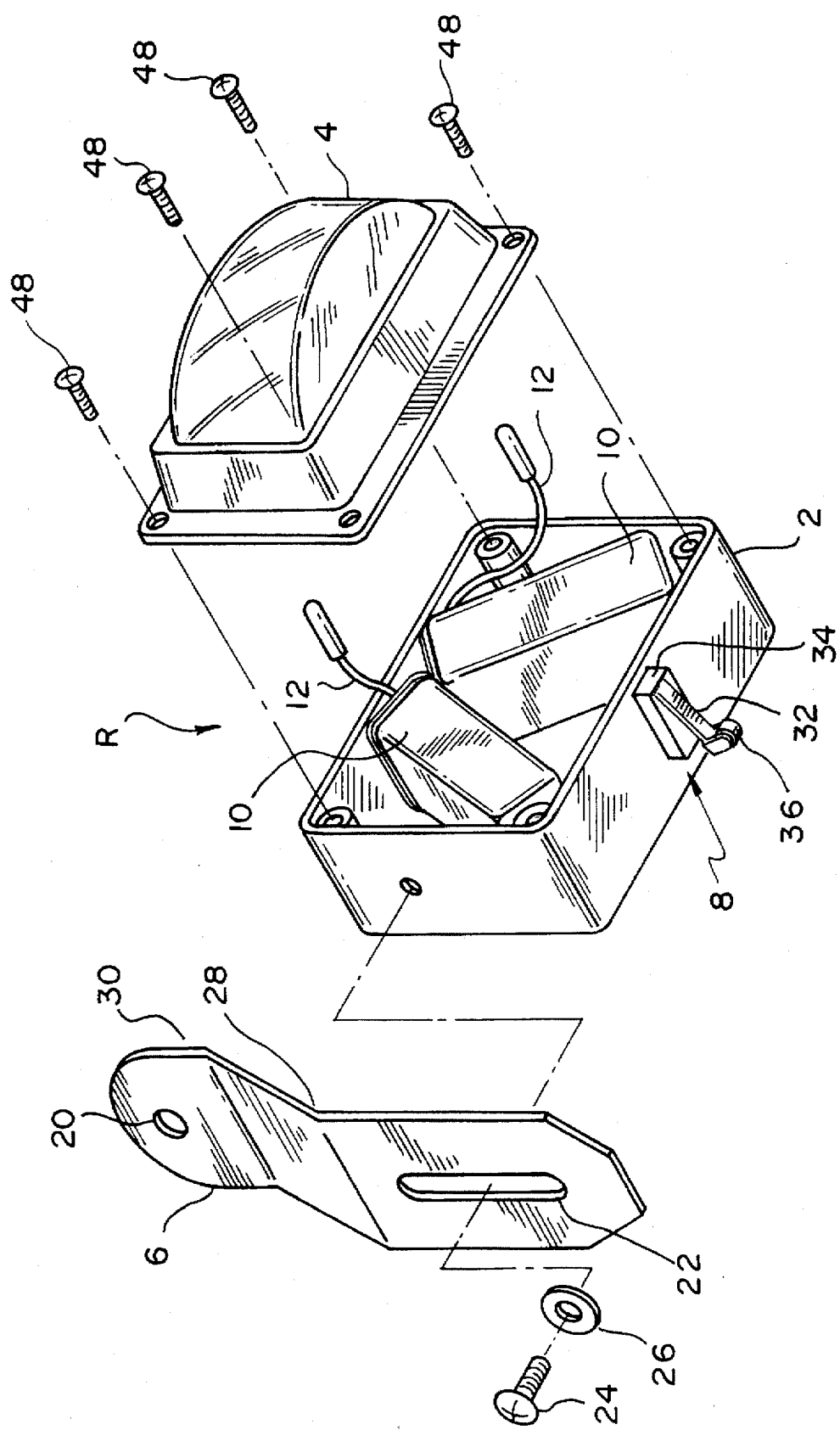
FIG. 2 is an exploded view of the brake light assembly shown in FIG. 1.

A brake light assembly R made in accordance with the present invention is disclosed in FIGS. 1 and 2. The assembly R comprises a housing 2, a lens 4, a pair of adjustable support brackets 6, a microswitch 8 operably connected to a pair of batteries 10 connected to a light bulb (not shown) within the lens 4 by means of wires 12.

The brackets 6 are secured by a clamp bolt 14 used to clamp a seat post 16 within a mainframe tube 18, as best shown in FIG. 1. Each bracket 6 has an opening 20 at one end to which the clamp bolt 14 passes. The hole 20 advantageously allows rotational adjustment for the brackets 6 about the axis of the bolt 14. A longitudinal slot 22 is provided at the other end of each bracket 6 to accommodate an attachment screw 24 and washer 26 for securing the bracket 6 to the housing 2. The slot 22 advantageously allows lateral adjustment and rotation along the axis of the screw 24 for the housing 2. The brackets 6 advantageously provide innumerable adjustments for the housing 2 when installing the brake light assembly R to a specific bicycle.

Each bracket 6 is appropriately angled at 28 and 30 to accommodate the width of the housing 2 while maintaining a compact attachment with the bolt 14.

An actuating arm 32 pivots at one end 34 and is spring biased in the downward direction. The actuating arm supports a roller 36 at its other end. The microswitch 8 is in the OFF state when the actuating arm 32 is in the down position. The microswitch assembly 8 is in the ON state when the actuating arm 32 is in the up position.

The brake light assembly R is associated with the bicycle rear caliper brake 38 such that the brake light is turned ON whenever the rear caliper brake 38 is actuated. The rear caliper brake 38 is actuated by a cable 40 which terminates in a disk 42 from which a pair of short cables or rods 44 extend and terminate at the caliper brake 38, as best shown in FIGS. 1, 3 and 4. The disk 42 provides a projection or rise above the cable 40 that engages the roller 36 when the arm 32 is in the down or OFF position, as best shown in FIG. 3. When the cable 40 is pulled forward to activate the rear caliper brake 38, the disk 40 moves along with the cable and forces the actuating arm 32 to move upwardly as the roller 36 rides over the projection and onto the top surface of the disk 42, as best shown in FIG. 4. In this position, the microswitch 8 is switched to the ON position, causing the light bulb within the lens 4 to turn When the rear caliper 38 is released, the cable 40 moves downwardly, causing the disk 42 to also move downwardly until the roller 36 to descend from the disk 42 and rest on the cable 40, causing the arm 32 to move downwardly whereby the microswitch 8 is deactivated to the OFF position, turning off the light bulb within the housing 2 in the OFF position.

In view of the above, the brake light is activated whenever the rear caliper brake 38 is activated and is likewise deactivated whenever the rear caliper brake is released.

The brake light assembly R is advantageously a self-contained unit, eliminating the need to wire the assembly with any part of the bicycle. Installation is therefore relatively easy.

For maintenance purposes, such as replacement of the batteries or the light bulb within the lens 4, attachment screws are easily removed to expose the batteries within the housing 2 and permits easy access to the light bulb within the lens 4.

While this invention has been described as having preferred designs it is understood that it is capable of further modifications, uses and/or adaptations of the invention following in general the principle of the invention and including such departures from the present disclosure as come within the known or customary practice in the art to which the invention pertains, and as may be applied to the central features hereinbefore set forth, and fall within the scope of the invention and the limits of the appended claims.

I claim:

1. A brake light for a bicycle having a caliper brake mechanism including a control cable with a projection, comprising:

a) a bulb operably connected to a power source;
   b) a housing;
   c) said bulb being secured to said housing;
   d) a mounting bracket for securing said housing to the frame of the bicycle;
   e) a switch operably connected to said bulb;
   f) said switch including a pivotable activating arm biased downwardly, said switch being OFF when said arm is down and ON when said arm is up;
   g) said arm including an end portion for being disposed along the control cable of the caliper brake mechanism upstream of a projection on the cable, such that when the brake is activated, the control cable and the projection move upstream to engage said end portion and move said arm upwardly, thereby turning ON said bulb; and
   h) said bracket including a slot and said housing is adjustably movable along said slot such that said arm end portion position relative to the cable projection can be adjusted.

2. A brake light for a bicycle having a caliper brake mechanism including a control cable with a projection, comprising:

a) a housing;
   b) a bulb disposed within said housing and operably connected;
   c) battery disposed within said housing and operably connected to said bulb;
   d) a mounting bracket for securing said housing to the frame of the bicycle;
   e) a switch secured to the outside of said housing and operably connected to said bulb;
   f) said switch including a pivotable activating arm biased downwardly, said switch being OFF when said arm is down and ON when said arm is up; and
   g) said arm including an end portion for being disposed along the control cable of the caliper brake mechanism upstream of the projection on the cable, such that when the brake is activated, the control cable and the projection move upstream to engage said end portion and move said arm upwardly, thereby turning ON said bulb.

3. A brake light as in claim 2, wherein:
   a) said housing includes a lens removably secured thereto.

4. A brake light as in claim 3, wherein:
   a) said housing includes an opening adapted to provide access to said battery within; and
   b) said lens is disposed across said opening.

5. A brake light as in claim 2, wherein:
   a) said mounting bracket includes first and second brackets; and b) said housing is disposed between said first and second brackets.

6. A brake light as in claim 2, wherein:
   a) said housing is for being disposed behind the bicycle seat.

7. A brake light as in claim 2, wherein:
   a) said bracket includes a slot; and
   b) said housing is adjustably movable along said slot such that said arm end portion position relative to the cable projection can be adjusted.

8. A brake light as in claim 2, wherein:
   a) said arm end portion includes a roller for riding along the control cable.

9. A brake light for a bicycle having a caliper brake mechanism including a control cable with a projection, comprising:

a) a bulb operably connected to a power source;
   b) a housing;
   c) said bulb being secured to said housing;
   d) a mounting bracket for securing said housing to the frame of the bicycle;
   e) said mounting bracket including first, second and third adjustments for positioning said housing over the control cable;
   f) a switch operably connected to said bulb;
   g) said switch including a pivotable activating arm biased downwardly, said switch being OFF when said arm is down and ON when said arm is up; and,
   h) said arm including an end portion for being disposed along the control cable of the caliper brake mechanism upstream of a projection on the cable, such that when the brake is activated, the control cable and the projection move upstream to engage said end portion and move said arm upwardly, thereby turning ON said bulb.

10. A brake light as in claim 9, wherein:
    a) said bracket includes an opening for mounting to a clamp bolt of the bicycle.

11. A brake light as in claim 9, wherein:
    a) said bracket includes a slot; and,
    b) said housing is adjustably moveable along said slot such that said arm end portion position relative to the cable projection can be adjusted.

12. A brake light as in claim 9, wherein:
    a) said arm end portion includes a roller for riding along the control cable.

13. A brake light as in claim 9, wherein:
    a) said housing includes a lens removably secured thereto.

14. A brake light as in claim 9, and further comprising:
    a) a battery disposed within said housing.

15. A brake light as in claim 9, wherein:
    a) said mounting bracket includes first and second brackets; and,
    b) said housing is disposed between said first and said second brackets.

16. A brake light as in claim 9, wherein:
    a) said housing is for being disposed behind the bicycle seat.

* * * * *